A. HUPP.
AUTOMATIC TRANSMISSION MECHANISM.
APPLICATION FILED JAN. 2, 1917.

1,358,447. Patented Nov. 9, 1920.

Witness
G. T. Bakr.

Inventor
Albert Hupp
By Foster Freeman Watson Noit
Attorney

UNITED STATES PATENT OFFICE.

ALBERT HUPP, OF WASHINGTON, DISTRICT OF COLUMBIA.

AUTOMATIC TRANSMISSION MECHANISM.

1,358,447.      Specification of Letters Patent.      Patented Nov. 9, 1920.

Application filed January 2, 1917. Serial No. 140,190.

*To all whom it may concern:*

Be it known that I, ALBERT HUPP, a citizen of the United States, residing at Washington, District of Columbia, have invented certain new and useful Improvements in Automatic Transmission Mechanism, of which the following is a specification.

This invention relates to a speed changing mechanism and more particularly to such a mechanism having means actuated from the driven member of the device for automatically varying the angular velocity ratio between the driving and driven members. The objects of the invention are to provide in variable speed mechanism means for automatically varying the angular velocity ratio actuated by the driven member; to provide in such a mechanism having oppositely arranged cones a plurality of interposed rollers for transmitting rotation from one cone to the other; and to provide a fluid device actuated from the driven member for varying the angular velocity ratio. Other objects will be apparent from the description taken in connection with the drawings, in which—

Figure 1:
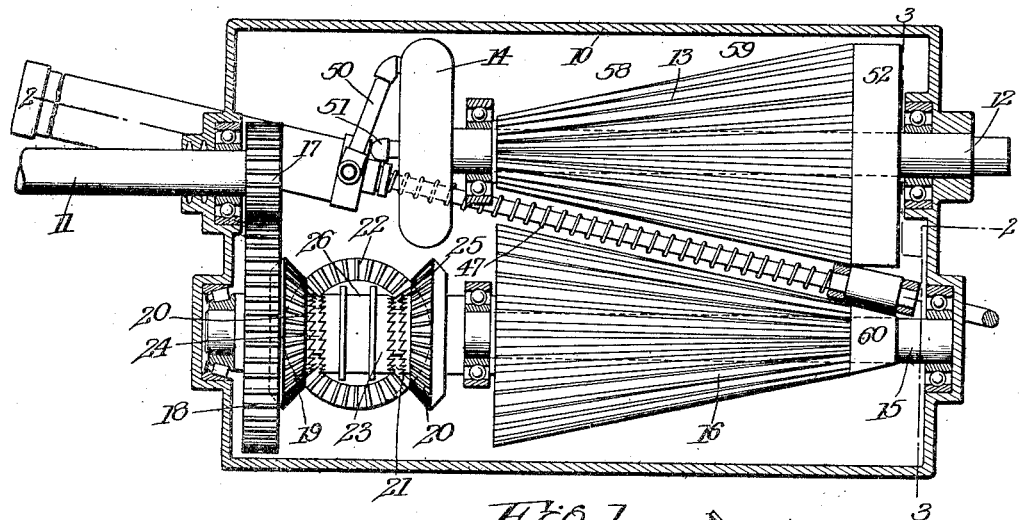
Figure 1 is a sectional view taken substantially on the line 1—1 of Fig. 2.

The mechanism is adapted to be housed in a transmission casing 10 which has the driving shaft 11 extending into the same at one side thereof which may be driven by any suitable device. A driven shaft 12 is mounted within the casing very nearly in alinement with the shaft 11 and extends outwardly through the side opposite the driving end. The driven shaft 12 has connected to rotate therewith in any suitable manner a friction cone 13 and at its inner end is connected to operate a centrifugal pump 14. A shaft 15 is arranged in the casing parallel with the shaft 12 and has mounted thereon to rotate therewith a cone 16, which is oppositely arranged with respect to the cone 13. The end of the driving shaft 11 which projects into the casing has a gear 17 keyed thereto, which is adapted to mesh with and drive a gear 18 loosely mounted on the shaft 15. This latter gear has compounded therewith a bevel gear 19 which is also loosely mounted on the shaft 15 and the hub of which is formed with clutch teeth 20. Spaced along the shaft 15 from the bevel gear 19 is a similar, but oppositely facing, bevel gear 20, the hub of which is also formed with clutch teeth 21 facing the clutch teeth 20 on the other bevel gear. The two bevel gears 19 and 20 mesh with a bevel gear 22, which has its axis at right angles to the axis of the said bevel gears. Interposed between the two gears 19 and 20 and splined to the shaft 15 is a slidably mounted clutch member 23 having clutch teeth 24 and 25 at its opposite ends. This clutch member 23 is provided with the annular groove 26, which is adapted to receive a fork or other means to shift the same longitudinally on the shaft 15. The member 23 is of such length that when it is in central position neither set of clutch teeth will be in engagement and consequently it will be in neutral position. When it is moved one way or the other either the bevel gear 19 or 20 will be connected with the shaft 15. Thus it will be apparent that when the clutch teeth 20 and 24 are thrown into engagement the shaft 15 will be driven in one direction, and when the clutch teeth 25 and 21 are thrown into engagement said shaft will be driven in the opposite direction.

Figure 3:
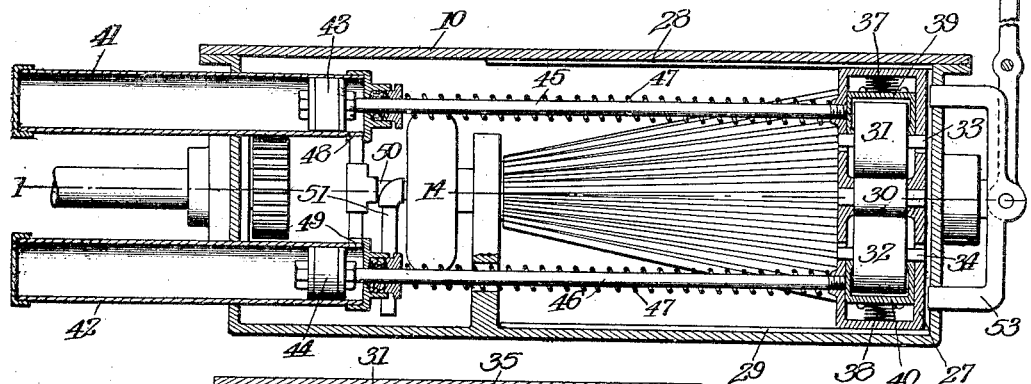
Fig. 3 is a transverse sectional view taken substantially on the line 3—3 of Fig. 1.
Figure 3:
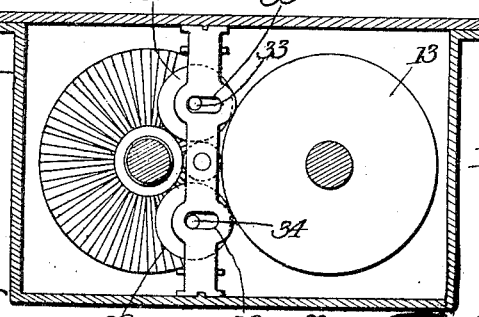

The cones 13 and 16 are adapted to be rotatively connected by means of a plurality of rollers interposed between the same. For this purpose a cage or frame 27 is mounted to slide on tracks 28 and 29 on the top and bottom, respectively, of the transmission casing, said tracks being arranged so that the frame will be caused to move along in the space between the two cones. This cage carries a central roller 30, the axis of which is arranged in the plane determined by the axes of the cones 13 and 16 and this roller is of such size that it may be in engagement with and rotatively connect the cones. Arranged above and below the roller 30 are two rollers 31 and 32 having their axes parallel with the axis of roller 30. The ends of the shafts 33 and 34 on which these latter rollers are mounted are arranged in slots 35 and 36 in the cage. As will appear from Fig. 3, these slots are elongated horizontally and are wider than the diameter of the shafts. Thus as the cage is moved along the cones the rollers 31 and 32 will be permitted to move sidewise as viewed in Fig. 3 to remain in contact with the cones. These rollers are forced into engagement with the cones by the springs 37 and 38 interposed between the ends of the cage and the U-shaped members 39 and 40, which have the ends of their sides pressing against the shafts 33 and 34 on which the rollers are mounted. It will be noted that as the slots 35 and 36 are wider than the diameter of the shafts these rollers may have a slight movement up and down, as viewed in Fig. 3, and consequently will be maintained in engagement with the cones by the springs 37 and 38.

The automatic means for moving the cage with the rollers to thereby vary the angular velocity ratio of the cones will now be described.

Figure 2:
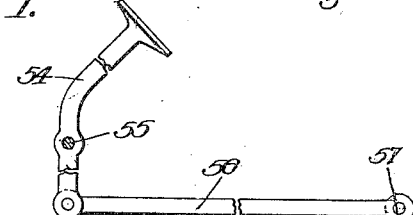
Fig. 2 is a sectional elevation taken substantially on the line of 2—2 of Fig. 1.

At the side of the transmission having the driving shaft 11 are two parallelly arranged cylinders 41 and 42 arranged one above the other and with their axes parallel with the tracks 28 and 29. Each of these cylinders has arranged therein a piston 43 and 44 and each piston has a piston rod 45 and 46 which, at their outer ends, are connected to the cage or frame 27. As shown in Fig. 2, these rods are arranged one above the other and are parallel and each carries a spring 47 interposed between the cage and the cylinder and these springs act to force the cage and pistons toward the right, as viewed in Fig. 2. As shown in this figure, the cylinders 41 and 42 at the ends adjacent the cones are formed with inlets 48 and 49, which, by means of conduits 50, are connected with the discharge of the centrifugal pump 14. The pump is adapted to take oil from the bottom of the casing by means of the conduit 51.

From the above description it will be apparent that as the driven member rotates and drives the centrifugal pump 14 a fluid pressure will be produced in the cylinders 41 and 42 acting against the pistons 43 and 44, thus tending to move the cage against the opposition of springs 47. Moreover this fluid pressure will increase with the speed of the driven member, thus producing greater force to overcome the resistance of the springs 47. Hence, as the speed of the driven member increases the cage carrying the rollers will be moved along between the cones until the pressure produced by the centrifugal pump is counter-balanced by the compression in the springs 47. Then a condition of equilibrium will be reached and the driving and driven members will rotate at constant speeds as long as this equilibrium is maintained.

It will be observed that the large end of the cone 13 is formed with a cylindrical portion 52 and that the small end 60 of the cone 16 opposite this cylindrical portion is tapered off so that when the cage is moved to the position opposite these two parts the rollers will not be in engagement with the cones but, because of the tapered portion 60 on the cone 16, when the cage is moved to the left, as viewed in Fig. 1, the engagement of the rollers with the cones will be gradual. As the springs 47 are of such strength that when the angular velocity of the driven cone 13 falls below a certain amount they overcome the fluid pressure in the cylinders and force the cage to the position where the rollers are out of engagement with the cones, it is necessary to provide some means to move the cage so as to engage the rollers with the cones in order to start up the device. For this purpose a U-shaped member 53 has its prongs extending through the side wall of the transmission casing and in engagement with the cage so that when it is moved inward the cage will be moved to carry the rollers into engagement with the cones. This U-shaped member 53 may be actuated from a foot pedal 54, pivoted at 55 through the link 56 and lever 57. If desired, the cones 13 and 16 may be provided with a series of corrugations 58 in order to give a non-slippable connection between the cones and the rollers. These corrugations may be formed by a series of grooves which extend from end to end of the cones and are equally spaced around the small end, and are wider at the large end.

This variable speed transmission mechanism is particularly adapted for use in motor vehicles although it is not restricted thereto. In the operation of the device, with the set of clutch teeth which will give forward rotation of the driven shaft 12 in engagement, if it is desired to start up the vehicle the foot pedal 54 will be operated to move the case with the rollers so that they form operative connection between the cones. Then as the driving shaft 11 is speeded up the driven shaft 12, of course, will rotate faster and produce a greater fluid pressure on the pistons 43 and 44, thereby moving the cage along the cones, compressing the springs 47 until the fluid pressure and the force exerted by the springs 47 balance. It is obvious that by this means an infinite number of speeds may be obtained between a very low speed and what would correspond to a direct drive. There are no levers to shift in order to accomplish these changes of speeds as the mechanism operates automatically after the rollers have once been engaged with the cones.

Having thus described the invention, what is claimed and desired to be secured by Letters Patent is:

1. A speed changing mechanism comprising a pair of axially parallel but oppositely arranged separated cones, means for driving one of said cones, a roller interposed between and bearing at its periphery on said cones to form a driving connection and movable along the same, and automatic means controlled by the speed of the driven cone for moving and determining the position of said roller longitudinally of the cones.

2. In a speed changing mechanism, a driving member, a driven member, means actuated by the driven member adapted to produce a fluid pressure in proportion to the angular velocity of the driven member, and means actuated by said fluid pressure adapted to progressively change the angular velocity ratio between said members from one ratio to another through all intermediate ratios.

3. In a speed changing mechanism, a driving member, a driven member, pump means actuated by the driven member, and means actuated by the fluid pressure produced by the pump adapted to progressively change the angular velocity ratio between said members from one ratio to another through all intermediate ratios.

4. In a speed changing mechanism, a driving member, a driven member, centrifugal pump means actuated by the driven member, and means actuated by the fluid pressure produced by the pump adapted to progressively change the angular velocity ratio between said members from one ratio to another through all intermediate ratios.

5. A speed changing mechanism comprising a pair of axially parallel but oppositely arranged cones, a roller interposed between said cones and movable along the same, elastic means opposing movement of said roller in one direction, and means actuated by one cone with a force in proportion to the angular velocity thereof to move the said roller in opposition to said elastic means.

6. A speed changing mechanism comprising a pair of axially parallel but oppositely arranged cones, a roller interposed between said cones and movable along the same, elastic means opposing movement in one direction, means actuated by one cone adapted to produce a fluid pressure in proportion to the angular velocity of the same, and means actuated by said fluid pressure in opposition to said elastic means adapted to move said roller along the cones.

7. A speed changing mechanism comprising a pair of axially parallel but oppositely arranged cones, a roller interposed between said cones and movable along the same, elastic means opposing movement in one direction and normally holding said roller out of operative engagement with said cones, means for moving said roller into operative engagement with said cones, and means actuated by one cone for moving the roller in opposition to said elastic means in proportion to the speed of said cone.

8. In a variable speed mechanism comprising two axially parallel oppositely arranged spaced apart cones, a frame movable between and along said cones and carrying three parallel rollers adapted to act simultaneously to form a driving connection between the cones, said rollers comprising one roller arranged with its axis in the plane determined by the axes of the cones and a roller laterally spaced on each side of the axis of the first roller, and means for forcing the latter rollers into contact with the cones.

In testimony whereof I affix my signature.

ALBERT HUPP.